(12) United States Patent
Ishi

(10) Patent No.: US 8,882,408 B2
(45) Date of Patent: Nov. 11, 2014

(54) CUTTING INSERT, CUTTING TOOL, AND METHOD OF MANUFACTURING MACHINED PRODUCT USING THE SAME

(75) Inventor: Hirohisa Ishi, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 398 days.

(21) Appl. No.: 13/380,642

(22) PCT Filed: Jun. 28, 2010

(86) PCT No.: PCT/JP2010/060979
§ 371 (c)(1),
(2), (4) Date: Dec. 23, 2011

(87) PCT Pub. No.: WO2011/001939
PCT Pub. Date: Jan. 6, 2011

(65) Prior Publication Data
US 2012/0093596 A1    Apr. 19, 2012

(30) Foreign Application Priority Data

Jun. 29, 2009 (JP) .................................. 2009-154337

(51) Int. Cl.
| | |
|---|---|
| *B23C 5/00* | (2006.01) |
| *B23B 27/22* | (2006.01) |
| *B23C 5/06* | (2006.01) |
| *B23C 5/20* | (2006.01) |

(52) U.S. Cl.
CPC . *B23C 5/202* (2013.01); *B23C 5/06* (2013.01); *B23C 2200/208* (2013.01); *B23C 2200/0444* (2013.01); *B23C 2200/081* (2013.01); *B23C 2200/087* (2013.01); *B23C 2200/205* (2013.01); *B23C 2200/203* (2013.01)
USPC .............. 407/116; 407/113; 407/114; 407/42

(58) Field of Classification Search
CPC .................................. B23C 5/00; B23B 27/22
USPC ................................ 407/34, 35, 42, 113–116
See application file for complete search history.

(56) References Cited

U.S. PATENT DOCUMENTS

| | | | | |
|---|---|---|---|---|
| 4,681,488 | A | * | 7/1987 | Markusson .................... 407/114 |
| 5,807,031 | A | * | 9/1998 | Arai et al. ...................... 407/113 |

(Continued)

FOREIGN PATENT DOCUMENTS

| | | |
|---|---|---|
| EP | 1813368 A2 | 8/2007 |
| EP | 1859883 A2 | 11/2007 |

(Continued)

OTHER PUBLICATIONS

Statement of Relevance of Non-English References, U.S. Appl. No. 13/380,642, 1 pp.

(Continued)

*Primary Examiner* — Andrea Wellington
*Assistant Examiner* — Sara Addisu
(74) *Attorney, Agent, or Firm* — Volpe and Koenig, P.C.

(57) ABSTRACT

A cutting insert having a cutting edge is located along an intersection of the upper surface and the side surface, having a major cutting edge, a second cutting edge, and a minor cutting edge located between the major cutting edge and the flat cutting edge. The upper surface includes a flat part located away from the cutting edge, and a rake face inclined downward from the cutting edge to the flat part. In at least a part between the major cutting edge and the flat part, a groove part lies along the major cutting edge. The groove part includes the rake face and a rising face inclined upward from the rake face to the flat part. A connection part where the rake face and the flat part exist continuously extends from the minor cutting edge to a boundary of the minor cutting edge and the major cutting edge.

14 Claims, 6 Drawing Sheets

(56) References Cited

U.S. PATENT DOCUMENTS

| | | | |
|---|---|---|---|
| 6,244,791 B1 * | 6/2001 | Wiman et al. | 407/114 |
| 6,733,212 B2 * | 5/2004 | Nagaya et al. | 407/34 |
| 7,232,279 B2 | 6/2007 | Smilovici et al. | |
| 7,419,338 B2 * | 9/2008 | Smilovici et al. | 407/113 |
| 7,431,540 B2 * | 10/2008 | Lof et al. | 407/113 |
| 7,547,164 B2 * | 6/2009 | Hessman | 407/113 |
| 8,419,319 B2 * | 4/2013 | Hatta | 407/113 |
| 8,485,764 B2 * | 7/2013 | Xu | 407/113 |
| 2004/0146365 A1 * | 7/2004 | Usui et al. | 407/113 |
| 2007/0003384 A1 | 1/2007 | Smilovici et al. | |
| 2007/0201962 A1 | 8/2007 | Limell et al. | |
| 2007/0224006 A1 | 9/2007 | Smilovici et al. | |
| 2007/0269278 A1 | 11/2007 | Scherbarth | |
| 2007/0297865 A1 | 12/2007 | Hessman | |
| 2010/0034602 A1 | 2/2010 | Sung et al. | |
| 2010/0202839 A1 | 8/2010 | Fang et al. | |
| 2010/0239379 A1 | 9/2010 | Choi et al. | |

FOREIGN PATENT DOCUMENTS

| | | |
|---|---|---|
| EP | 1872889 A1 | 1/2008 |
| EP | 2396133 | 12/2011 |
| JP | 08-323510 | 12/1996 |
| JP | 2006-075913 | 3/2006 |
| JP | 2008-006579 | 1/2008 |
| JP | 2008-194793 | 8/2008 |
| JP | 2008-544872 | 12/2008 |
| WO | 2008078892 A1 | 7/2008 |
| WO | WO 2008120188 A3 * | 11/2008 |
| WO | 2009028748 A1 | 3/2009 |
| WO | 2010093488 A1 | 8/2010 |

OTHER PUBLICATIONS

Japanese Office Action, Japanese Patent Application No. 2011-520912, Jun. 4, 2013, 3 pp.

* cited by examiner (a)

(b)

(a)

(b)

(c)

(a)

(b)

(c)

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

Conventionally, in a cutting insert including a major cutting edge for cutting a workpiece and a second cutting edge, sometimes referred to as a flat cutting edge for smoothing the surface of the workpiece produced by the cutting, a minor cutting edge having a larger peripheral cutting edge angle than the major cutting edge is formed between the major cutting edge and the flat cutting edge from the viewpoint of damage reduction of a cutting edge. For example, Japanese Unexamined Patent Publication No. 2008-544872 discloses a cutting insert in which the angle formed between a major cutting edge and a flat cutting edge is 45°, and an intermediate cutting edge 11 (minor cutting edge) having a larger peripheral cutting edge angle than the major cutting edge is formed between the major cutting edge and the flat cutting edge.

However, in the cutting insert including the cutting edges having different peripheral cutting edge angles, such as the major cutting edge and the minor cutting edges, the chips generated from the individual cutting edges flow differently at a boundary of the major cutting edge and the minor cutting edge. Therefore, the chips might be twisted, and it might be difficult to perform chip treatment.

SUMMARY OF THE INVENTION

An object of the present invention is to provide a cutting insert, particularly a negative type cutting insert having excellent chip discharge performance, a cutting tool, and a method of manufacturing a machined product using the same.

A cutting insert according to an embodiment of the present invention includes an upper surface; a lower surface; a side surface connected to the upper surface and the lower surface; and a cutting edge which is located along an intersection of the upper surface and the side surface, and includes a major cutting edge, a second or flat cutting edge, and a minor cutting edge located between the major cutting edge and the second cutting edge. The upper surface includes a flat part which is located away from the cutting edge and is perpendicular to a central axis of the cutting insert, and a rake face inclined downward from the cutting edge to the flat part. In at least a part between the major cutting edge and the flat part, a groove part lies along the major cutting edge. The groove part includes the rake face and a rising face which is inclined upward from the rake face to the flat part and connects the rake face and the flat part. A connection part where the rake face and the flat part exist continuously extends from the minor cutting edge to a boundary of the minor cutting edge and the major cutting edge.

A cutting tool according to an embodiment of the present invention includes the cutting insert and a holder configured to attach the cutting insert thereto.

A method of manufacturing a machined product according to an embodiment of the present invention includes rotating the cutting tool; bringing the cutting edge of the rotating cutting tool into contact with surface of a workpiece; and separating the cutting tool from the workpiece.

In the cutting insert according to the embodiment of the present invention, the connection part where the rake face and the flat part exist continuously extends from the minor cutting edge to the boundary of the minor cutting edge and the major cutting edge, and the specific groove part is disposed on the upper surface along the major cutting edge. Therefore, the cutting insert performs a satisfactory chip treatment for a wide range of chip sizes.

That is, with the cutting insert according to the embodiment of the present invention, the small width chips susceptible to twisting, which are generated when the amount of depth of cut is small, namely, when only the minor cutting edge is used, or when the vicinity of the boundary of the minor cutting edge and the major cutting edge is used mainly, can be curled while reducing twisting, by the region where the rake face and the flat part exist continuously. On the other hand, the large width chips less susceptible to twisting, which are generated when the amount of depth of cut is large, namely, when the major cutting edge is used mainly, can be curled by stabilizing the chip flow by the corresponding groove part.

BRIEF DESCRIPTION OF THE DRAWINGS

FIG. 2(*b*) is a side view thereof;

FIG. 4(*b*) is a schematic sectional view taken along the line B-B in FIG. 3; FIG. 4(*c*) is a schematic sectional view taken along the line C-C in FIG. 3;

PREFERRED EMBODIMENTS FOR CARRYING OUT THE INVENTION

<Cutting Insert>

Figure 1:
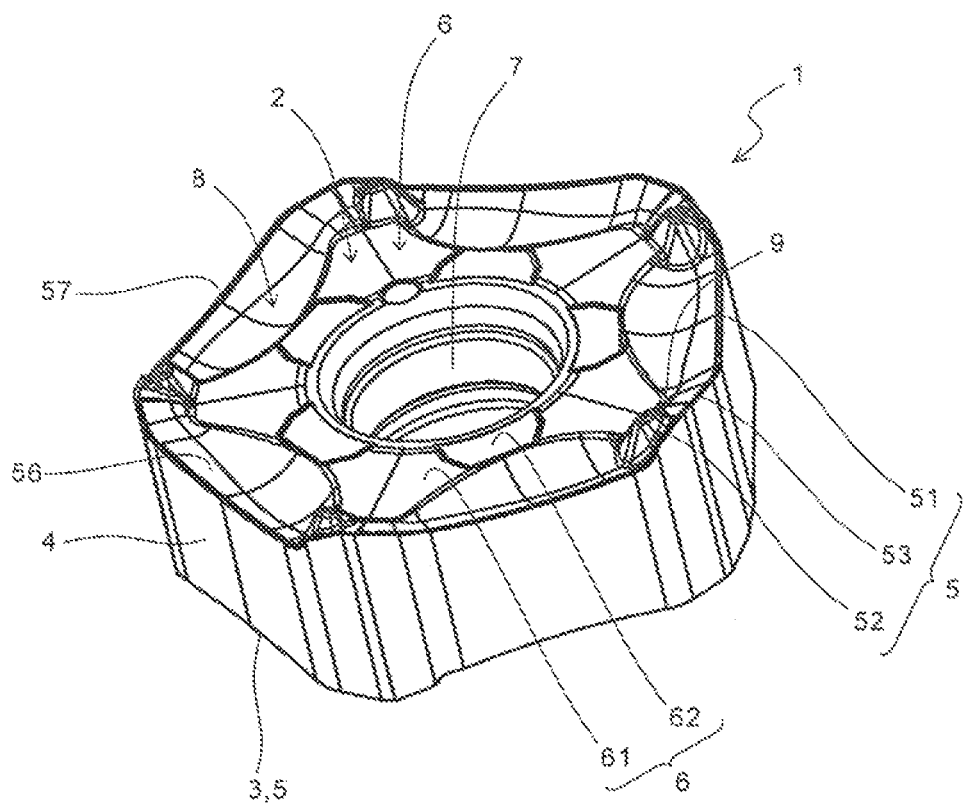
FIG. 1 is a general perspective view showing a cutting insert according to an embodiment of the present invention.
Figure 2:
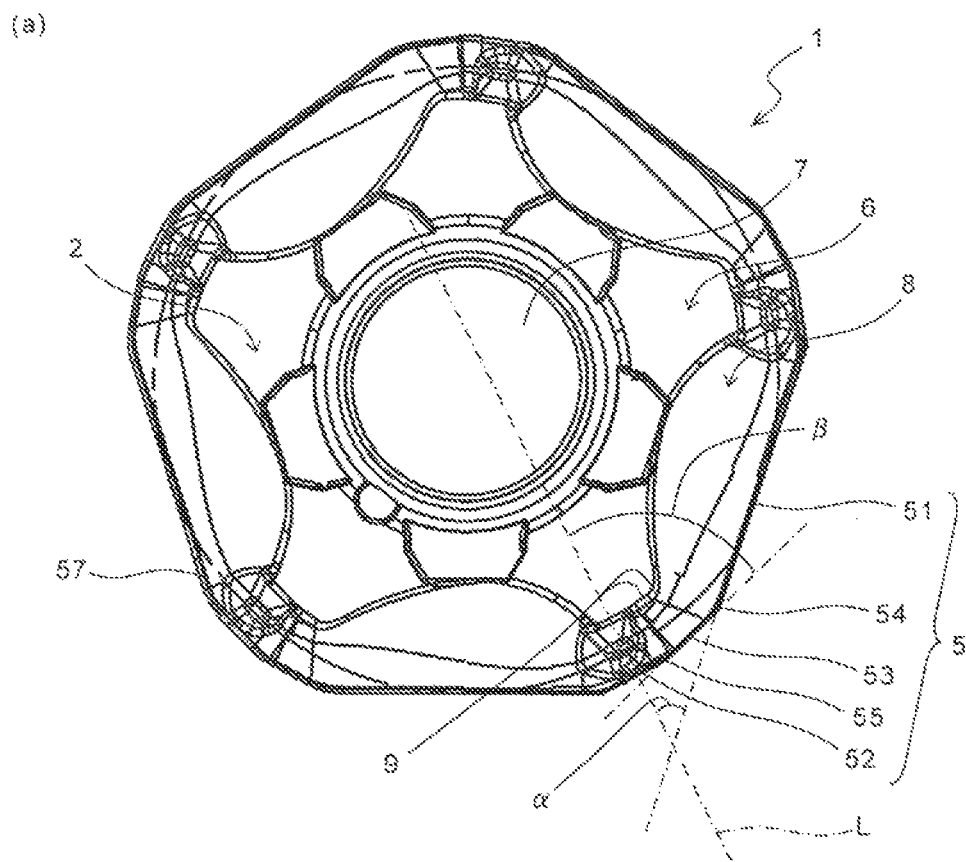
FIG. 2(*a*) is a top view of the cutting insert shown in FIG. 1.
Figure 2:
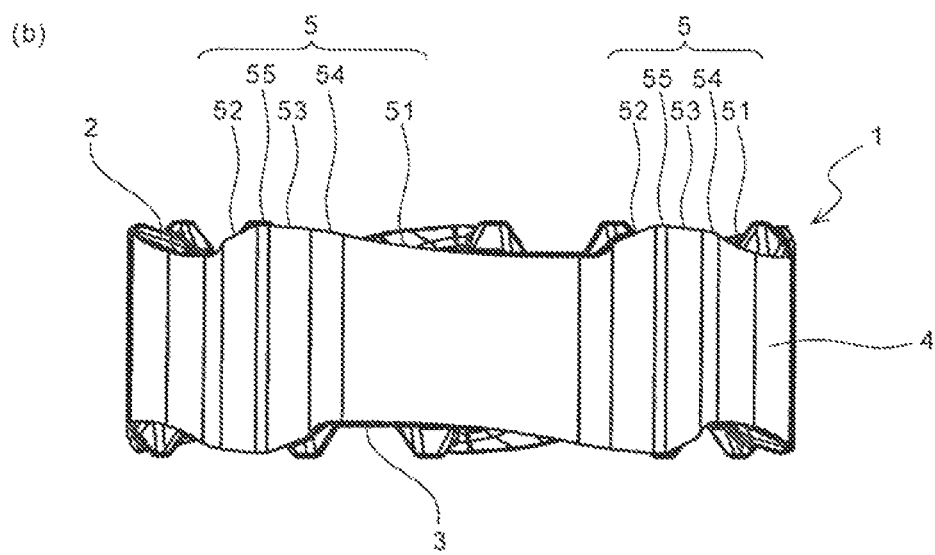

An embodiment of the cutting insert (hereinafter referred to as "insert" in some cases) according to the present invention is described in detail below with reference to FIGS. 1 to 4. Referring to FIG. 1, the insert 1 includes a body part of a substantially polygonal plate shape. No particular limitation is imposed on the shape of the body part. That is, the body part may have a certain shape usually employed by those skilled in the art, such as triangle, quadrangle, pentagon, hexagon, and octagon in a top view. The present embodiment employs a substantially pentagonal shape having five long sides. The insert size may be suitably set depending on cutting conditions. For example, the length of one side is 8-12 mm, and the thickness is 4-8 mm.

The body part also includes an upper surface 2, a part of which functions as a rake face; a lower surface 3, a part of which functions as a seating face; and a side surface 4 which is continuous with the upper surface 2 and the lower surface 3, and functions as a flank face. Cutting edges 5 are respectively formed along the intersection of the upper surface 2 and the side surface 4.

Further, the upper surface 2 includes flat parts 6, each of which is spaced away from the cutting edge 5. In the present specification, the term "flat part" denotes the flat part located away from the cutting edge on the upper surface. The flat part may be made up of a plurality of flat portions of different heights. In the present embodiment, the flat part 6 includes a high position flat portion 61 and a low position flat portion 62 located at a lower position than the high position flat portion 61. In the present specification, the terms "high position" and "low position" denote positional relationships in a direction perpendicular to a flat surface when the lower surface is left to stand on the flat surface. Further, the flat part 6 is provided with an attachment screw contact part 7 extending through the body part from the upper surface 2 to the lower surface 3. The attachment screw contact part 7 is disposed at a central part surrounded by the flat parts 6.

To be specific, in the insert 1, the side surface 4 is perpendicularly connected to the upper surface 2 and the lower surface 3. That is, the insert 1 is a negative type insert allowing both the upper surface 2 and the lower surface 3 to be used as the rake face. Therefore, the insert 1 is the insert whose ten corners are usable. In this case, the cutting edge 5 is also formed along an intersection of the lower surface 3 and the side surface 4. The lower surface 3 also includes the flat part 6 (not shown) spaced away from the cutting edge 5.

When the cutting edge 5 close to the lower surface 3 is used, the lower surface 3 is used as the rake face, and the upper surface 2 is used as the seating face. In this case, the flat part 6 on the upper surface 2 functions as the seating face. The insert of the present invention may be a so-called positive type insert in which a clearance angle is imparted to the side surface 4.

Figure 3:
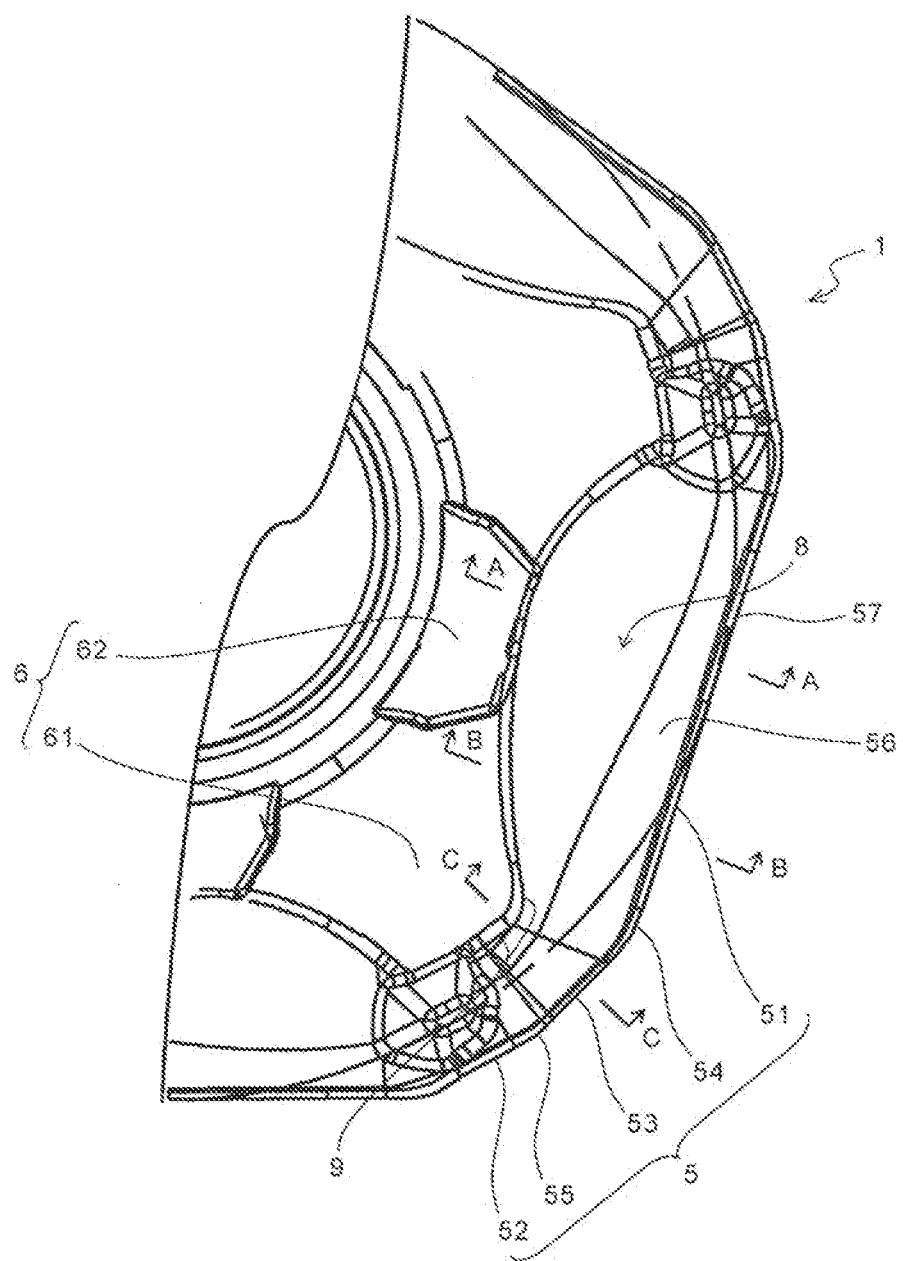
FIG. 3 is a partially enlarged view of the cutting insert shown in FIG. 2(*a*)

The cutting edge 5 formed along the intersection of the upper surface 2 and the side surface 4 includes a major cutting edge 51, a second or flat cutting edge 52, and a minor cutting edge 53 disposed between the major cutting edge 51 and the flat cutting edge 52. Further in the present embodiment, as shown in FIGS. 2(a) and 3, a first corner cutting edge 54 is formed between the major cutting edge 51 and the minor cutting edge 53, and a second corner cutting edge 55 is formed between the minor cutting edge 53 and the flat cutting edge 52. The cutting edge 5 may have a linear shape or curved shape in a top view.

The major cutting edge 51 performs a major role in the formation of chips during cutting action. The major cutting edge 51 is configured to be the longest among the cutting edges 5 (51-55).

No particular limitation is imposed on the shape of the major cutting edge 51. The major cutting edge 51 may have a linear shape or curved shape (arcuate shape) in a top view. It is suitable for the major tutting edge 51 to have a positive axial rake with respect to the rotation center axis of a holder when attaching to the holder. Hence, the major cutting edge 51 is preferably inclined downward away from the minor cutting edges 53 adjacent to each other in a side view, as shown in FIG. 2(b). In the present specification, the term "downward" denotes a concept indicating a direction from the upper surface to the lower surface of the insert with respect to a plane orthogonal to the center axis of the insert.

In the present embodiment, the major cutting edge 51 has the linear shape in the top view as shown in FIGS. 1 and 2(a). The major cutting edge 51 has a concave shape toward the lower surface 3, and straight line connecting both ends thereof is inclined with respect to the lower surface 3 in the side view as shown in FIG. 2(b). This allows the major cutting edge 51 of the insert 1 to be attached to the holder so as to have a positive axial rake. From the viewpoint of cutting resistance reduction, the major cutting edge 51 may be provided with a groove part that divides the major cutting edge 51.

The major cutting edge 51 is located at a higher position than the flat part 6 as shown in FIG. 4(a). This reduces contacts between the chips after passing through the rake face 56, and the flat part 6, thereby achieving efficient discharge.

The second or flat cutting edge 52 is formed for improving the surface finish roughness of a workpiece. The flat cutting edge 52 has a linear shape in the top view as shown in FIGS. 1 and 2(a), and is inclined upward toward the minor cutting edge 53 in the side view as shown in FIG. 2(b). In the present specification, the term "upward" denotes a concept indicating a direction from the lower surface to the upper surface of the insert with respect to the plane orthogonal to the center axis of the insert.

The minor cutting edge 53 has a larger peripheral cutting edge angle than the major cutting edge 51, and is disposed in order to support the cutting by the major cutting edge 51, for example, for the purpose of decreasing the cutting resistance of the major cutting edge 51, or reducing damage to the major cutting edge 51.

In the present specification, the term "peripheral cutting edge angle" means an inclination angle of the cutting edge with respect to the rotation center axis of the holder when the insert is attached to the holder. For example, as shown in FIG. 2(a), the peripheral cutting edge angle of the major cutting edge 51 can be expressed by an angle α formed between a line L parallel to the rotation center axis of the holder, and the major cutting edge 51 in a top view. The peripheral cutting edge angle of the minor cutting edge 53 can be expressed by an angle β formed between the line L and the minor cutting edge 53.

For example, the peripheral cutting edge angle α of the major cutting edge 51 is set to approximately 0-60°, and the peripheral cutting edge angle β of the minor cutting edge 53 is set to approximately 60-80°. In consideration of damage and defect in the cutting edges 5, the peripheral cutting edge angle β of the minor cutting edge 53 is set to more than two times the peripheral cutting edge angle α of the major cutting edge 51. The minor cutting edge 53 is only required to locate between the major cutting edge 51 and the flat cutting edge 52, and a plurality of minor cutting edges may be disposed therebetween.

Referring to FIG. 2(b), the minor cutting edge 53 is preferably inclined downward from the flat cutting edge 52 to the major cutting edge 51 in a side view. Particularly, the minor cutting edge 53 preferably has such an inclination angle as to have a positive axial rake with the insert 1 attached to the holder.

Referring to FIG. 4(c), the minor cutting edge 53 is located at a higher position than the flat part 6. This reduces contacts between the chips after passing through the rake face 56, and the flat part 6, thereby achieving efficient discharge.

No particular limitation is imposed on the lengths of the major cutting edge 51, the second or flat cutting edge 52, and the minor cutting edge 53 so long as the major cutting edge 51 is configured to be the longest among the cutting edges 5. For example, the length of the major cutting edge 51 and the length of the minor cutting edge 53 are set in the ratio of 2:1 to 10:1, preferably 2:1 to 6:1. The length of the flat cutting edge 52 and the length of the minor cutting edge 53 are set in the ratio of 1:1 to 6:1. When designing a negative type insert, the length of the flat cutting edge and the length of the minor cutting edge are usually set in the ratio of 1:1.

Both the first corner cutting edge 54 and the second corner cutting edge 55 have a curved shape in a top view, and are formed in a state that the radius of curvature of the first corner cutting edge 54 is larger than the radius of curvature of the second corner cutting edge 55. This reduces large thickness variation among chips respectively generated from the major cutting edge 51 and the minor cutting edge 53 thus permitting shape control of the chips. Alternatively, the first corner cutting edge 54 and the second corner cutting edge 55 may be linearly chamfered.

The upper surface 2 further includes a rake face 56 inclined downward from the cutting edge 5 to the inside, namely, from the cutting edge 5 to the flat part 6. In the present specification, the term "inside" denotes the inside of the body part with respect to the cutting edge, namely, a chip discharge direction.

Figure 4:
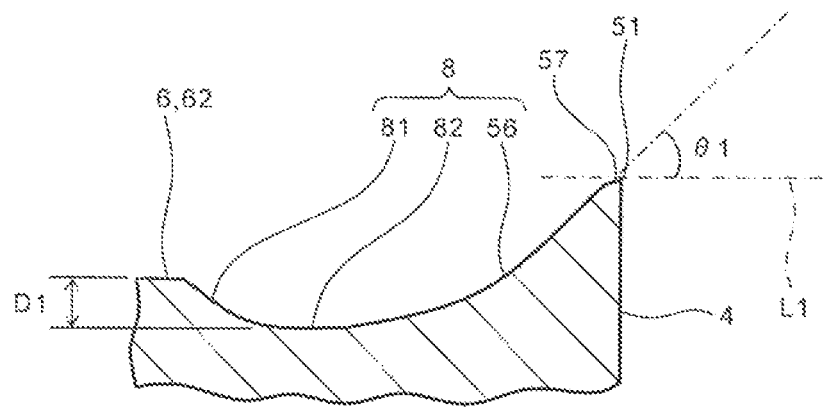
FIG. 4(*a*) is a schematic sectional view taken along the line A-A in FIG. 3.
Figure 4:
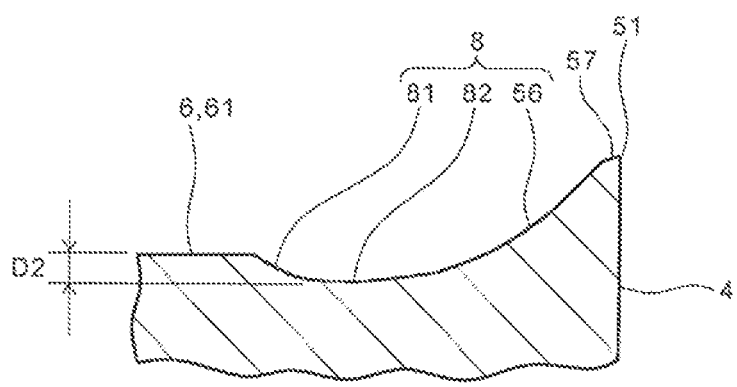
Figure 4:
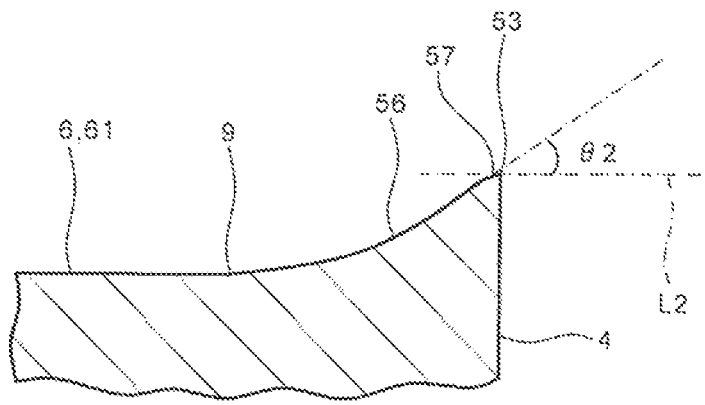

The rake face 56 is the face along which the generated chips contactingly pass through. The rake face may have a linear shape or curved shape in a cross-sectional view, or alternatively a shape obtained by combining a straight line and a curved line. In the present embodiment, as shown in FIG. 4, all of the rake faces 56 corresponding to the major cutting edge 51 and the minor cutting edge 53 have a concave curve part.

Furthermore, when θ1 denotes a rake angle of the rake face 56 corresponding to the major cutting edge 51, and θ2 denotes a rake angle of the rake face 56 corresponding to the minor cutting edge 53, θ1 and θ2 have a relationship of θ1>θ2. Thereby, the chips generated according to an amount of depth of cut can be suitably deformed according to the size thereof, and then discharged to the exterior. Here at, the rake angle is determined as being plus (+) when it is inclined downward on the basis of a plane perpendicular to the central axis of the insert, and is determined as being minus (−) when it is inclined upward.

In the present specification, the term "rake angle" is an angle formed between line L1 or L2 passing through the major cutting edge 51 or the minor cutting edge 53 and being orthogonal to the central axis (not shown) of the insert in a cross section perpendicular to the major cutting edge 51 or the minor cutting edge 53, and the rake face 56 corresponding to the major cutting edge 51 or the minor cutting edge 53, specifically, a maximum rake angle orthogonal to the major cutting edge 51 or the minor cutting edge 53 in a top view. The rake faces 56 corresponding to the respective cutting edges are preferably formed continuously with each other.

Referring to FIG. 3, in at least a part between the major cutting edge 51 and the flat part 6, a groove part 8 is disposed along the major cutting edge 51. The groove part 8 includes the rake face 56, and a rising face 81 connecting the rake face 56 and the flat part 6, as shown in FIGS. 4(a) and 4(b).

The groove part 8 performs the role of a so-called chip breaker, and is formed for further facilitating curling of the chips generated from the major cutting edge 51. The groove part 8 contributes to a stable chip flow and curling of large width chips less susceptible to twisting, which are generated when the amount of depth of cut is large, namely, when the major cutting edge 51 is used mainly.

In the present embodiment, the groove part 8 has a concave shape and also has a bottom portion 82. The bottom portion 82 is located at the lowest position in the groove part 8 in a cross-sectional view perpendicular to the major cutting edge 51, and is also located at a lower position than the flat part 6. The bottom portion 82 extends continuously along the major cutting edge 51. The bottom portion 82 having such a specific positional relationship stabilizes the chip flow.

As shown in FIG. 3, the groove part 8 is configured to include a region where a groove width is largest in a top view (refer to the line A-A in FIG. 3). The groove 8 is also configured to have the largest groove depth in the region where the groove width is largest, as shown in FIGS. 4(a) and 4(b). Thereby, the deformed shape of chips, namely, the curling shape thereof is optimized to improve the discharge performance to the exterior.

In the present specification, the term "groove width" of the groove part denotes a distance in a direction orthogonal to the cutting edge in a top view, that is, a width of the groove part contributing to a chip curling action. In the present specification, the term "groove depth" of the groove part denotes a maximum size of the groove part in a direction perpendicular to the upper surface in a cross section passing through a line perpendicular to the cutting edge in the top view.

As described above, the bottom portion 82 exits continuously along the major cutting edge 51, and a partial region of the bottom portion is preferably inclined (an inclined groove region) downward away from the minor cutting edge 53. This permits curling of even large width chips generated due to an increased amount of depth of cut, thus contributing to excellent chip discharge performance.

In the present embodiment, when D1 denotes a distance (groove depth) between the flat part 6 and the bottom portion 82 as shown in FIGS. 4(a), and D2 denotes a distance between the flat part 6 and the bottom portion 82 as shown in FIG. 4(b), D1 and D2 have a relationship of D1>D2.

The rising face 81 is the face that rises from the bottom portion 82 to the flat part 6 in the shape of a slope. The rising face may have a linear shape, a curved shape, or a shape obtained by combining a straight line and a curved line in a cross-sectional view. In the present embodiment, the rising face 81 has a concave curve part. The rising face 81 includes a region where the radius of curvature of the concave curve part is increased away from the minor cutting edge 53. This ensures stable curling of the chips even when the amount of depth of cut is increased.

Oh the other hand, as shown in FIG. 3 and FIG. 4(c), the rake face 56 and the flat part 6 are continuously disposed from the minor cutting edge 53 to the vicinity of a boundary of the minor cutting edge 53 and the major cutting edge 51. That is, a non-groove part 9 where the rake face 56 and the flat part 6 exist continuously is disposed between the minor cutting edge 53 and the flat part 6.

To be specific, the non-groove part 9 corresponds to the part where a portion (groove) located at a lower position than the flat part 6, or a portion including no rising face is not present between the rake face 56 and the flat part 6. That is, the non-groove part 9 is the part where the rake face 56 and the flat part 6 are directly connected to each other without interposing therebetween the bottom portion 82 and the rising face 81. In other words, the non-groove part indicates a connection part between the rake face 56 and the flat part 6.

The non-groove part 9 is also disposed continuously from the minor cutting edge 53 to the vicinity of the boundary of the minor cutting edge 53 and the major cutting edge 51. Thereby, small-width chips susceptible to twisting, which are generated when the amount of depth of cut is small, can be curled while reducing twisting.

Hereat, the range of the vicinity of the boundary of the minor cutting edge 53 and the major cutting edge 51 indicates, for example, a range including the distance from the boundary to the major cutting edge 51 and the length of the minor cutting edge 53. In the present embodiment, the minor cutting edge 53 and the major cutting edge 51 are connected to each other through the first corner cutting edge 54. Therefore, the vicinity of the boundary of the minor cutting edge 53 and the major cutting edge 51 corresponds to the first corner cutting edge 54. That is, the rake face 56 and the flat part 6 are continuously disposed from the minor cutting edge 53 to the first-corner cutting edge 54.

Referring to FIG. 3, the non-groove part (connection part) in the minor cutting edge 53 is Parallel to the minor cutting edge 53 in a top view. Further, the vicinity of the boundary of the minor cutting edge 53 and the major cutting edge 51, namely, the non-groove part 9 in the first corner cutting edge 54 is inclined inward away from the minor cutting edge in the top view. Thereby, the chips generated from the minor cutting edge and the chips generated in the vicinity of the boundary can be smoothly deformed without forming a step or the like in the boundary region thereof.

Whereas on the upper surface 2, a land part 57 is formed along the cutting edge 5 from the viewpoint of reducing defects in the cutting edge 5. To be specific, the land part 57 is a narrow-width belt-like face formed between the cutting edge 5 and the rake face 56. The cutting edges 5 are formed along the entire circumference of an edge part in the insert 1, and the land part 57 is formed inside the cutting edges.

The attachment screw contact part 7 is specifically a holder attachment hole, which is formed in a substantially cylindrical shape so as to extend through the body part. The attachment screw contact part 7 is forted for the purpose of fixing the insert 1 to the holder. The insert 1 is fixed to the holder by inserting an attachment screw into the attachment screw contact part 7, and then screwing it into the holder.

As a material constituting the foregoing insert, for example, a PVD film or CVD film formed on the surface of a substrate composed of cemented carbide or cermet by PVD method or CVD method, or composite films of these films can be suitably used. In particular, a structure having the PVD film formed on the surface of a cemented carbide substrate is suitable in the machining necessitating chipping resistance, such as when cutting steel, stainless steel, or ductile cast iron. A structure having the CVD film formed on the surface of the cemented carbide substrate is suitable in the machining necessitating wear resistance, such as high-speed cutting of gray cast iron. A structure having the PVD film formed on the surface of a cermet substrate is suitable in finishing.

<Cutting Tool>

Figure 5:
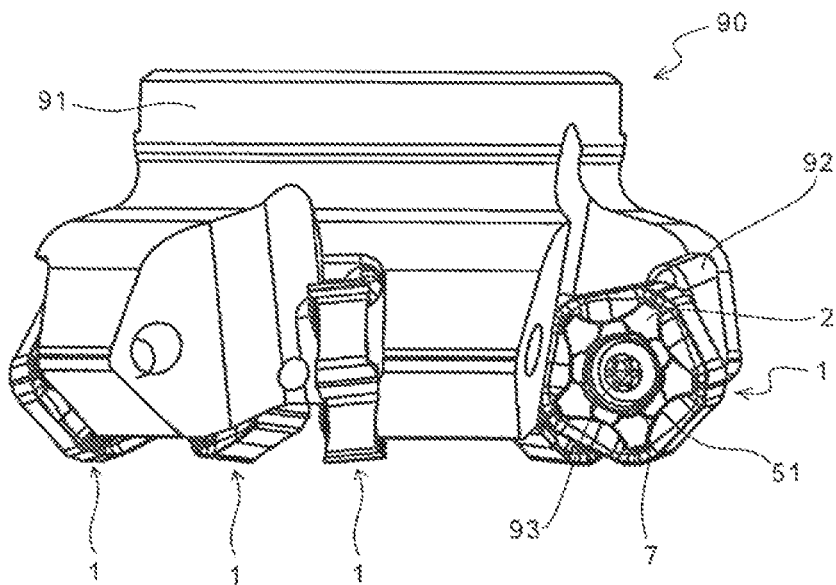
FIG. 5 is a side view showing a cutting tool according to an embodiment of the present invention.

An embodiment of the cutting tool according to the present invention is described in detail below with reference to FIGS. 5 and 6. As shown in FIG. 5, the cutting tool 90 (rotary cutting tool) of the present embodiment include a plurality of inserts 1 and a holder 91 configured to attach the plurality of inserts 1 thereto.

Figure 6:
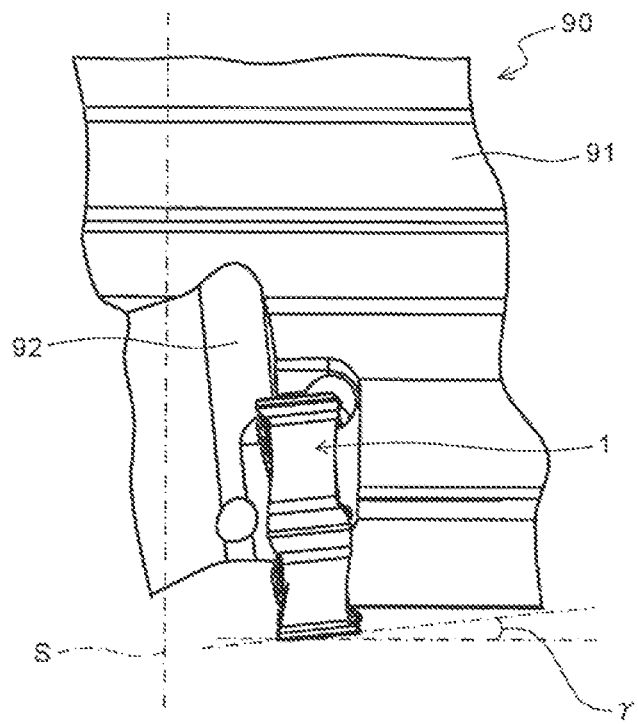
FIG. 6 is a partially enlarged view of the cutting tool shown in FIG. 5.

A plurality of insert pockets 92 are formed along the peripheral edge portion of the holder 91. The inserts 1 are respectively attached to peripheral positions in these insert pockets 92. Specifically, each of the inserts 1 is attached in a state that the major cutting edge 51 is located at the outermost periphery with the upper surface 2 (rake face 56) oriented forwardly in the direction of rotation. The attachment is performed, for example, by inserting an attachment screw 93 into an attachment screw contact part 7 (screw hole) of each of the inserts 1, and then screwing it into the holder 91:

Referring to FIG. 6, each of the inserts 1 that is the negative type insert is attached to the holder 91 with a negative axial rake γ in a side view. The axial rake γ is preferably approximately 6°.

In the present embodiment, as shown in FIG. 2(b), the major cutting edge 51 and the minor cutting edge 53 are inclined downward away from the second or flat cutting edge 52. Therefore, as shown in FIG. 6, the major cutting edge 51 and the minor cutting edge 53 have a positive axial rake with respect to a rotation center axis S of the holder 91. Alternatively, the major cutting edge 51 and the minor cutting edge 53 may have a negative axial rake with respect to the rotation center axis S of the holder 91. The cutting tool 90 performs cutting with the major cutting edge 51, the minor cutting edge 53, and the flat cutting edge 52 by rotating the holder 91.

<Method of Manufacturing Machined Product>

Figure 7:
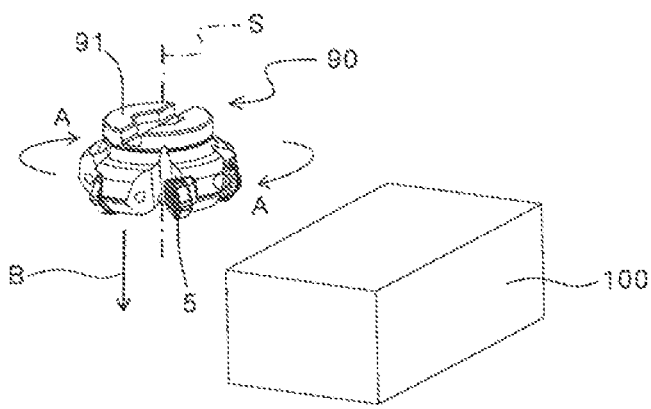
FIGS. 7(*a*) to 7(*c*) are process drawings showing a method of manufacturing a machined product according to an embodiment of the present invention.
Figure 7:
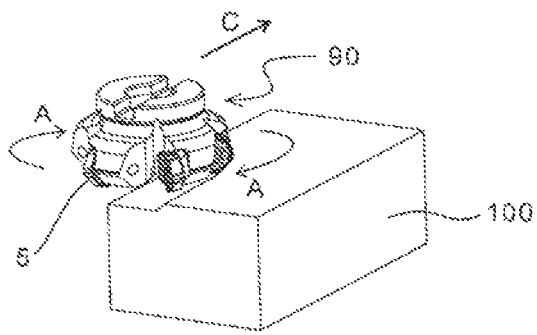
Figure 7:
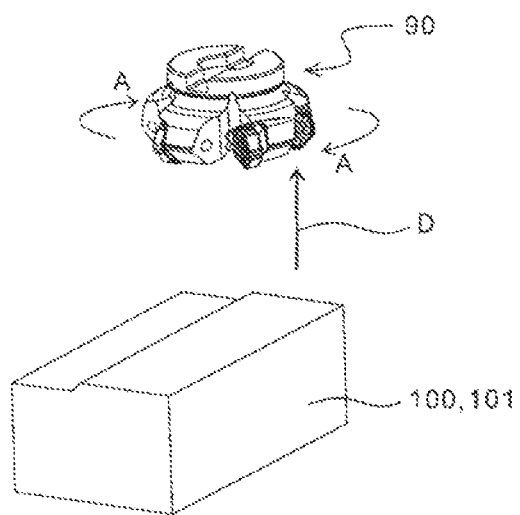

An embodiment of the method of manufacturing a machined product according to the present invention is described in detail with reference to FIG. 7, by taking the case of using the cutting tool 90 as example. As shown in FIG. 7, the method of Manufacturing the machined product according to the present embodiment includes the step of rotating the cutting tool 90; the step of bringing the cutting edges 5 of the rotating cutting tool 90 into contact with the surface of a workpiece 100; and the step of separating the cutting tool 90 from the workpiece 100.

To be specific, firstly, the inserts 1 are attached to the holder 91. At this time, the inserts 1 are attached to the insert pockets 92 of the holder 91 along the same circumference of the holder 91.

Subsequently, as shown in FIG. 7(a), the cutting tool 90 is rotated in the direction of arrow A around the rotation center axis S of the holder 91. Then, the cutting edges 5 are brought near the workpiece 100 by moving the cutting tool 90 in the direction of arrow B.

Subsequently, as shown in FIG. 7(b), the surface of the workpiece 100 is cut by bringing the cutting edges 5 of the rotating cutting tool 90 into contact with the surface of the workpiece 100, and by moving the cutting tool 90 in the direction of arrow C. For example, the cutting tool 90 is capable of cutting the surface of the workpiece 100 in substantially parallel.

Subsequently, as shown in FIG. 7(c), the cutting tool 90 is separated from the workpiece 100 by moving the cutting tool 90 in the direction of arrow D. When the cutting is continued, the step of bringing the cutting edge 5 of the cutting tool 90 into contact with different portions of the workpiece 100 may be repeated while retaining the rotation of the cutting tool 90. As the result, the machined product 101 is obtained.

When the cutting edge 5 in use is worn, an unused cutting edge 5 may be used by rotating the insert 1 around the center axis of the insert 1.

While the several embodiments according to the present invention have been described and illustrated above, it is to be understood that the present invention is not limited to the foregoing embodiments and is applicable to any optional embodiments without departing from the gist of the present invention.

The invention claimed is:

1. A cutting insert, comprising: an upper surface; a lower surface; a side surface connected to the upper surface and the lower surface; and a cutting edge which is located along an intersection of the upper surface and the side surface, and comprises a major cutting edge, a second cutting edge, and a minor cutting edge located between the major cutting edge and the second cutting edge, the second cutting edge inclined upward toward the minor cutting edge, wherein the upper surface comprises a flat part located away from the cutting edge and being perpendicular to a central axis of the cutting insert, and a rake face inclined downward from the cutting edge to the flat part, in at least a part between the major cutting edge and the flat part, a groove part lies along the major cutting edge and comprises the rake face and a rising face, the rising face which is inclined upward from the rake face to the flat part and connects the rake face and the flat part, and a connection part where the rake face and the flat part exist continuously extends from the minor cutting edge to a boundary of the minor cutting edge and the major cutting edge.

2. The cutting insert according to claim 1, wherein the groove part further comprises a bottom portion that is lowest in a cross-sectional view perpendicular to the major cutting edge, and the bottom portion comprises a region inclined downward away from the minor cutting edge.

3. The cutting insert according to claim 1, wherein the groove part comprises a region where a groove width is largest in a top view, and a portion where a groove depth is largest is located in the region where the groove width is largest.

4. The cutting insert according to claim 1, wherein the rising face comprises a concave curve part having a concave shape and a curve shape in a cross-sectional view perpendicular to the major cutting edge, and a radius of curvature of the concave curve part is increased from the major cutting edge to inside of the upper surface.

5. The cutting insert according to claim 1, wherein a portion of the connection part which lies along the minor cutting edge is parallel to the minor cutting edge in a top view, a portion of the connection part which lies along the boundary is inclined inwardly of the upper surface away from the minor cutting edge.

6. The cutting insert according to claim 1, wherein both the major cutting edge and the minor cutting edge are inclined downward away from the second cutting edge.

7. The cutting insert according to claim 1, wherein both the major cutting edge and the minor cutting edge are located above the flat part.

8. The cutting insert according to claim 1, wherein when $\theta1$ denotes a rake angle of a portion of the rake face which lies along the major cutting edge and $\theta2$ denotes a rake angle of a portion of the rake face which lies along the minor cutting edge, the $\theta1$ and the $\theta2$ have a relationship of $\theta1>\theta2$.

9. The cutting insert according to claim 1, wherein the cutting edge further comprises: a first corner cutting edge located between the major cutting edge and the minor cutting edge; and a second corner cutting edge located between the minor cutting edge and the second cutting edge, and both the first corner cutting edge and the second corner cutting edge have a curved shape in a top view.

10. The cutting insert according to claim 9, wherein a radius of curvature of the first corner cutting edge is larger than a radius of curvature of the second corner cutting edge in a top view.

11. The cutting insert according to claim 1, wherein the side surface is connected to the upper surface and the lower surface, and is parallel to the central axis of the cutting insert.

12. A cutting tool, comprising: a cutting insert according to claim 1; and a holder configured to attach the cutting insert thereto.

13. The cutting tool according to claim 12, wherein the cutting insert is attached to the holder in a state that the major cutting edge and the minor cutting edge have a positive or negative axial rake with respect to a rotation center axis of the holder.

14. A method of manufacturing a machined product, comprising: rotating a cutting tool according to claim 12; bringing the cutting edge of the rotating cutting tool into contact with a surface of a workpiece; and separating the cutting tool from the workpiece.

* * * * *